United States Patent
Dziak et al.

(10) Patent No.: US 9,424,878 B1
(45) Date of Patent: Aug. 23, 2016

(54) TWO DIMENSIONAL MAGNETIC RECORDING HEAD SEPARATION CALCULATOR

(71) Applicant: Avago Technologies General IP (Singapore) Pte. Ltd., Singapore (SG)

(72) Inventors: Scott Dziak, Ft. Collins, CO (US); Xiao Ma, Shanghai (CN); Lu Pan, San Jose, CA (US); Zhi Bin Li, Shanghai (CN); Haitao Xia, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/614,403

(22) Filed: Feb. 4, 2015

(51) Int. Cl.
*G11B 5/02* (2006.01)
*G11B 21/02* (2006.01)
*G11B 20/10* (2006.01)

(52) U.S. Cl.
CPC .............................. *G11B 20/10481* (2013.01)

(58) Field of Classification Search
CPC .......... G11B 20/10; G11B 5/39; G11B 5/596; G11B 5/09; G11B 5/48; G11B 5/012; G11B 5/4886; G11B 17/30
USPC .............. 360/77.13, 77.08, 31, 75, 53, 51, 39
See application file for complete search history.

(56) References Cited

U.S. PATENT DOCUMENTS

| 5,130,859 | A  | * | 7/1992 | Seki ................... G11B 15/1875 360/77.13 |
| 8,760,785 | B1 |   | 6/2014 | Zou et al. |
| 8,780,470 | B1 |   | 7/2014 | Wang et al. |
| 9,099,132 | B1 | * | 8/2015 | Grundvig ............. G11B 5/4886 |
| 2013/0286502 | A1 | | 10/2013 | Erden et al. |

OTHER PUBLICATIONS

U.S. Appl. No. 14/259,388, Unpublished (filed Apr. 23, 2014) (Travis Oenning).
U.S. Appl. No. 14/158,739, Unpublished (filed Jan. 17, 2014) (George Mathew).
U.S. Appl. No. 14/055,886, Unpublished (filed Oct. 17, 2013) (Xiufeng Song).
U.S. Appl. No. 14/048,897, Unpublished (filed Oct. 8, 2013) (George Mathew).
U.S. Appl. No. 14/031,990, Unpublished (filed Sep. 19, 2013) (George Mathew).
U.S. Appl. No. 14/021,811, Unpublished (filed Sep. 9, 2013) (George Mathew).

\* cited by examiner

*Primary Examiner* — Nabil Hindi (57) ABSTRACT

A method for calculating an average phase offset in a two dimensional magnetic recording system includes calculating a phase offset as a difference between a phase of a first signal derived from a first read head and a second phase of a second signal derived from a second read head, correcting for phase wrapping differences between the phase offset and a previous phase offset, determining whether the phase offset is consistent with the previous phase offset, and calculating an average phase offset which includes the phase offset only if it is consistent with the previous phase offset.

20 Claims, 4 Drawing Sheets

TWO DIMENSIONAL MAGNETIC RECORDING HEAD SEPARATION CALCULATOR

FIELD OF THE INVENTION

Various embodiments of the present invention provide systems and methods for calculating head separation delay in a two dimensional magnetic recording servo system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of data on the storage medium is identified by servo data. In an array reader magnetic recording system, the read/write head assembly includes an array of multiple read heads each positioned to read the target track. The separation of the read heads can vary, altering the phase offset between signals from the different read heads, particularly as the array of read heads is moved over the magnetic storage medium. The accuracy of estimations of the phase offset is important to correctly align and combine the signals.

SUMMARY

Various embodiments of the present invention provide systems, apparatuses and methods for calculating head separation delay in a two dimensional magnetic recording servo system.

In some embodiments, a method for calculating an average phase offset in a two dimensional magnetic recording system includes calculating a phase offset as a difference between a phase of a first signal derived from a first read head and a second phase of a second signal derived from a second read head, correcting for phase wrapping differences between the phase offset and a previous phase offset, determining whether the phase offset is consistent with the previous phase offset, and calculating an average phase offset which includes the phase offset only if it is consistent with the previous phase offset.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components.

DETAILED DESCRIPTION OF THE INVENTION

A head separation calculator is disclosed herein which reliably estimates the difference in time between signals from an array reader in a two dimensional magnetic recording system. The head separation calculator estimates the $\Delta T$, the delay or phase offset between the signals from two read heads when reading the same bit. By reliably estimating $\Delta T$, the signals from multiple read heads in the array reader can be processed and combined to improve the signal to noise ratio (SNR) when processing the data read from the storage medium. The head separation calculator prevents errors due to phase wrap in a sinusoidal preamble pattern, providing more reliable averaging of $\Delta T$ estimates.

The $\Delta T$ estimates are differences between phase estimates for a pair of read heads as they read sinusoidal preamble patterns. In some embodiments, each period of the sinusoidal preamble pattern is measured in radians over a range of values depending on the length of the preamble pattern. For example, the full period of a 2T preamble pattern such as, but not limited to, a repeating [1100] can be measured in radians over a range of 0 to 1024, and the full period of a 3T preamble pattern such as, but not limited to, a repeating [111000] can be measured in radians over a range of 0 to 1536. If the array reader is reading a 2T preamble pattern in the example embodiment above, the phase estimate of the signal from each read head will fall within the range of 0 to 1024. Because there is some separation between each read head, one might cross the boundary from one period to the next before the other, causing the phase estimation for the read head crossing the boundary to wrap from the top of the phase estimate range, e.g., 1024, to the bottom of the phase estimate range, e.g., 0. Again, these numbers are merely examples intended to illustrate phase wrapping and are not specific characteristics of every embodiment. Any type or length of data pattern can be used, with any range of phase values before wrapping.

Because the phase estimates for each read head in the array reader wrap around at different times because of their separation, the $\Delta T$ estimates contain relatively wide variations. The head separation calculator compensates for these phase wrapping variations by performing pre-wrapping and consistency checks before including estimates in $\Delta T$ averaging.

The head separation calculator also filters out or eliminates lower quality read events so that they do not reduce the reliability of ΔT estimates. In some embodiments, if a ΔT estimate varies from the average ΔT more than a particular threshold, after accounting for phase wrapping, it is discarded as having come from a poor quality read. Because the separation between read heads is fixed and only varies as the array reader is moved between the inner diameter and the outer diameter of the disk platter, effectively changing the angle of the read heads along the data track being read, the ΔT phase separation should not have dramatic changes between read events. The threshold for changes in ΔT can be set at a level that weeds out poor quality reads with erroneous ΔT estimates, while allowing for some variation in ΔT estimates and supporting the phase wrap compensation. The term "reliable head separation estimation" is used herein to refer to an estimation of the distance between read heads in an array reader, calculated based on phase estimates for the signals from the read heads. In some embodiments, the term "reliable head separation estimation" also includes the use of a threshold to filter out poor quality read events with ΔT estimates that differ too greatly from an average ΔT estimate. In some embodiments, a read event comprises the reading of a preamble for a data sector on a magnetic hard disk drive.

Figure 1:
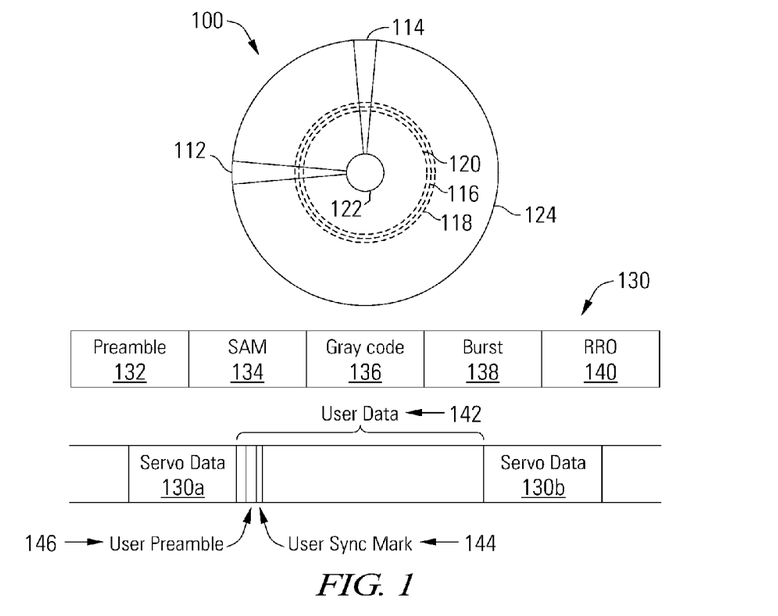
FIG. 1 is a diagram of a magnetic storage medium and sector data scheme that may be used with a two dimensional magnetic recording head separation calculator in accordance with some embodiments of the present invention.

Turning to FIG. 1, a diagram of a magnetic storage medium and sector data scheme is shown that can be used with a two dimensional magnetic recording servo channel with reliable head separation estimation. The magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor with multiple read heads that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

The data processing system that processes some or all of the servo data (e.g., 130) retrieved from servo regions (e.g., 112) is referred to herein as a servo channel. As the servo data (e.g., 130) is processed by the servo channel, signals from multiple read heads in the two dimensional magnetic recording system are produced representing the servo data (e.g., 130). Phase estimates for the signals are produced, and the ΔT or offset between the signals is calculated, accounting for phase wrapping in repeating preamble patterns, and filtering out ΔT estimates from poor quality read events.

Figure 2:
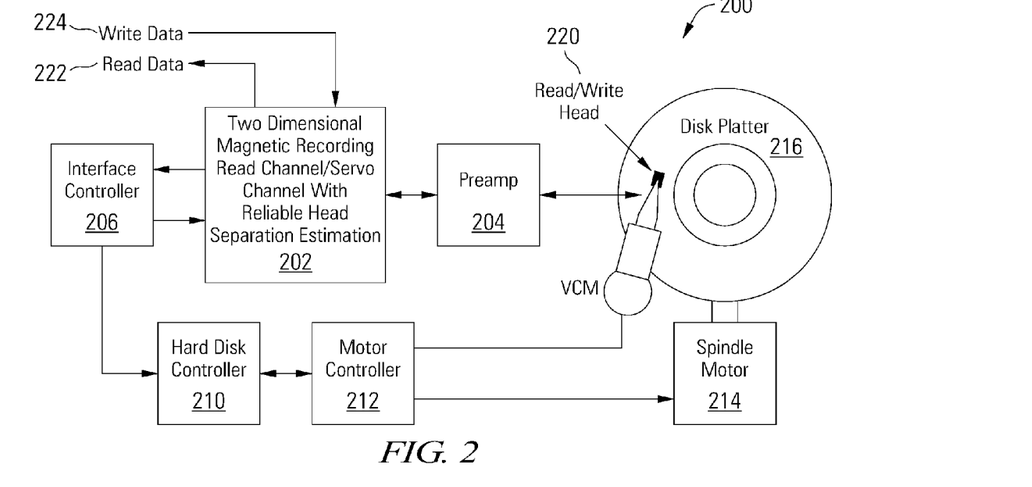
FIG. 2 depicts a storage system including a two dimensional magnetic recording read channel/servo channel with reliable head separation estimation in accordance with some embodiments of the present invention.

Turning to FIG. 2, a storage system 200 is disclosed which includes a read channel/servo channel circuit 202 with a head separation calculator in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, servo channel circuit 202 processes servo data to correctly position the read/write head assembly 220 over the disk platter 216, and the read channel circuit digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While reading servo data, read channel/servo channel circuit 202 reliably estimates ΔT, accounting for phase wrapping in repeating preamble patterns, and filtering out ΔT estimates from poor quality read events, in order to determine the separation between the read heads in read/write head assembly 220.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
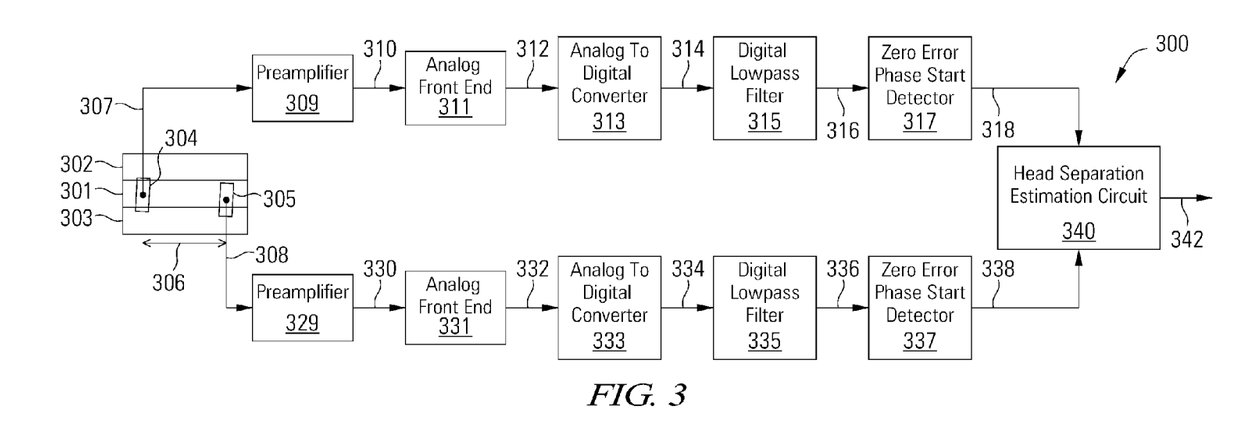
FIG. 3 is a block diagram of a two dimensional magnetic recording servo channel with reliable head separation estimation in accordance with some embodiments of the present invention.

Turning to FIG. 3, a two dimensional magnetic recording servo channel 300 with head separation estimation circuit 340 is depicted in accordance with some embodiments of the present invention. An array reader or sensor includes multiple read heads such as, but not limited to, the two read heads 304, 305 shown in FIG. 3. The read heads 304, 305 are positioned over a target track 301 between side tracks 302, 303. In some embodiments, there is a down track separation 306 between the read heads 304, 305, causing a phase offset between the signals 307, 308 from the read heads 304, 305. In some embodiments, separate processing paths are provided for each of the signals 307, 308 from the read heads 304, 305.

Preamplifiers 309, 329 amplify the analog signals 307, 308 from read heads 304, 305, yielding amplified analog signals 310, 330. Analog signals 307, 308 may be, but are not limited to, minute analog electrical signals derived from read heads 304, 305 in the array reader of a read/write head assembly that is disposed in relation to a storage medium (not shown). Based upon the disclosure provided herein, one of ordinary skill in the art will recognize a variety of sources from which analog signals 307, 308 may be derived. Analog front end circuits 311, 331 receive and process the amplified analog signals 310, 330, providing processed analog signals 312, 332 to analog to digital converter circuits 313, 333. Analog front end circuits 311, 331 may include, but are not limited to, an analog filter and an amplifier circuit as are known in the art. Based upon the disclosure provided herein, one of ordinary skill in the art will recognize a variety of circuitry that may be included as part of analog front end circuits 311, 331.

Analog to digital converter circuits 313, 333 convert processed analog signals 312, 332 into corresponding series of digital samples 314, 334. Analog to digital converter circuits 313, 333 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention. Digital samples 314, 334 are provided to digital lowpass filters 315, 335, which filter the digital samples 314, 334 in any suitable manner to reduce noise and improve downstream detection. In some embodiments, the tap coefficients of the digital lowpass filters 315, 335 are adapted based in part on the ΔT estimate. Based upon the disclosure provided herein, one of ordinary skill in the art will recognize a variety of digital lowpass filter circuits that may be used in relation to different embodiments of the present invention.

The filtered digital samples 316, 336 are provided to Zero Error Phase Start (ZPS) detector circuits 317, 337, which calculate phase estimates 318, 338 for the filtered digital samples 316, 336 based upon the sinusoidal preamble patterns as they are read by the read heads 304, 305. Based upon the disclosure provided herein, one of ordinary skill in the art will recognize a variety of phase detector circuits that may be used in relation to different embodiments of the present invention.

The phase estimates 318, 338 are provided to a head separation estimation circuit 340 which calculates ΔT estimates as the difference between the phase estimates 318, 338, compensates for phase wrapping in the phase estimates 318, 338, and applies comparisons with a threshold to filter out poor quality read events with ΔT estimates that differ too greatly from an average ΔT estimate. The head separation estimation circuit 340 yields an average ΔT estimate, which can be used, for example, to configure the analog to digital converters 313, 333, adapt the tap coefficients of the digital lowpass filters 315, 335, configure downstream equalizers, and/or combine the signals, etc.

An example of phase estimates in radians for the signals from two read heads is presented in the table below:

| | | | | | | | | | | |
|---|---|---|---|---|---|---|---|---|---|---|
| Head 1 phase | 129 | 893 | 896 | 383 | 892 | 895 | 128 | 383 | 638 | 132 |
| Head 2 phase | 242 | 1020 | 1 | 512 | 1021 | 0 | 256 | 512 | 764 | 259 |

In this example, the difference between the phase estimate for head 2 minus the phase estimate for head 1 should be about 130 in each case. Notably, in the third and sixth phase estimates, the phase difference is −895 due to phase wrapping in the signal from head 2, where the phase estimate drops to 1 and 0 but the phase estimate from head 1 has not wrapped. If the ΔT estimates based on the third and sixth phase estimates, the average ΔT estimate would be negatively impacted.

Figure 4A:
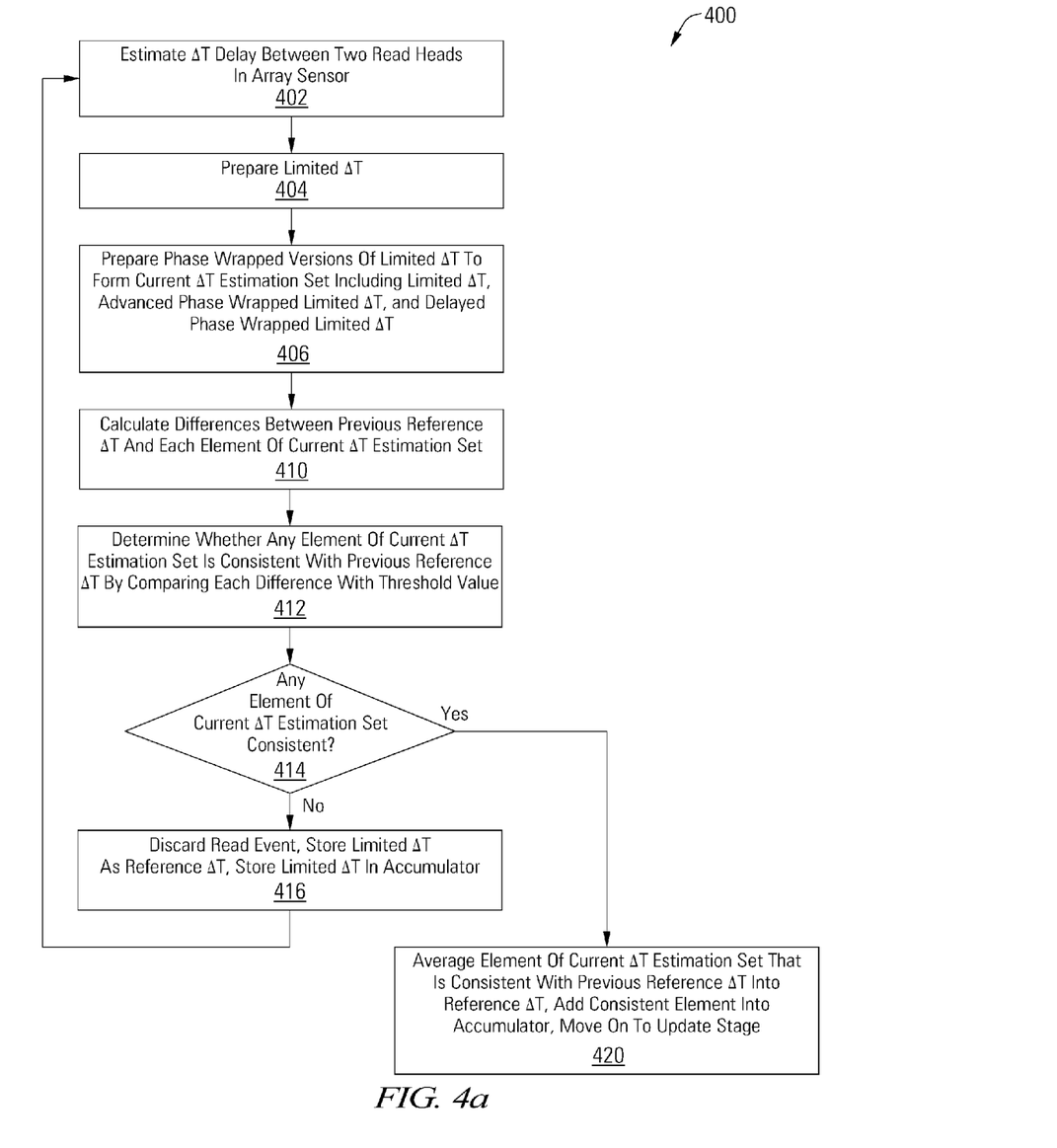
FIG. 4a is a flow diagram showing a boot stage in a method for head separation estimation in accordance with some embodiments of the present invention.

Turning to FIG. 4A, a flow diagram 400 illustrates a boot stage in a method for head separation estimation in accordance with some embodiments of the present invention. The boot stage establishes a reference value for the ΔT estimate so that ΔT averaging begins with a good read event without phase wrapping errors. Following flow diagram 400, the ΔT phase delay between two read heads in an array sensor is estimated. (Block 402) The ΔT estimate is calculated in some embodiments as the difference between the phase value for the signals from the two read heads. The phase value can be calculated for the signals in any manner, such as, but not limited to, using a Zero Phase Start circuit. The ΔT estimate is limited to a range based on the phase range of the preamble pattern period. (Block 404) For example, given a 2T preamble with a range of 1024 radians, the ΔT estimate is limited to a range of [−512,511] in some embodiments. Given a 3T preamble with a range of 1536 radians, the ΔT estimate is limited to a range of [−768,767] in some embodiments. This can be accomplished, for example, as set forth in the following pseudo-code:

2T: Limit to [−512,511]
If ΔT>511, ΔT_limit=ΔT−1024
Else if ΔT<−512, ΔT_limit=ΔT+1024
3T: Limit to [−768,767]
If ΔT>767, ΔT_limit=ΔT−1536
Else if ΔT<−768, ΔT_limit=ΔT+1536

Phase wrapped versions of the limited ΔT are prepared to form a current ΔT estimation set including the limited ΔT, an advanced phase wrapped limited ΔT, and a delayed phase wrapped limited ΔT. (Block 406) For the example 2T embodiment, the advanced phase wrapped limited ΔT is set to the limited ΔT plus 1024 (ΔT_limit+1024), and the delayed phase wrapped limited ΔT is set to the limited ΔT minus 1024 (ΔT_limit−1024). (Note that the concepts of advancing and delaying the phase can be viewed from several different perspectives, and are therefore not strictly defined as set forth in this example. The terms "advanced" and "delayed" are merely used for convenience in distinguishing the different versions of the ΔT estimate, and the definitions can be reversed in an equivalent embodiment.) For the example 3T embodiment, the advanced phase wrapped limited ΔT is set to the limited ΔT plus 1536 (ΔT_limit+1536), and the delayed phase wrapped limited ΔT is set to the limited ΔT minus 1536 (ΔT_limit−1536).

The difference between the previous reference ΔT and each element of the current ΔT estimation set is calculated. (Block 410) For the first read event when there is no previous reference ΔT, the limited ΔT is used as the previous reference ΔT in some embodiments. Each of the differences are compared with a threshold value to determine whether any element of the current ΔT estimation set is consistent with the previous reference ΔT. (Block 412) The operations of steps 410, 412 can be combined and represented as conditions in the following pseudo-code:

2T:
A. |Δ_limit−ΔT_ref|<threshold
B. |Δ_limit+1024−ΔT_ref|<threshold
C. |Δ_limit−1024−ΔT_ref|<threshold
3T:
A. |Δ_limit−ΔT_ref|<threshold
B. |Δ_limit+1536−ΔT_ref|<threshold
C. |Δ_limit−1536−ΔT_ref|<threshold A determination is made as to whether any element of the current ΔT estimation set is consistent. (Block 414) In some embodiments, this determination is made based on the conditions of the pseudo-code above. In other words, an element of the current ΔT estimation set is consistent when the ΔT estimate is within the threshold range of the reference ΔT after accounting for phase wrapping. If no element of the current ΔT estimation set is consistent, meaning that the limited ΔT estimate and its phase wrapped versions are all outside the threshold range of the reference ΔT, the read event is discarded. The limited ΔT is stored as the reference ΔT for the next boot stage iteration, and the limited ΔT is stored in an accumulator used to generate an average ΔT, replacing the previous contents of the accumulator. (Block 416) The next iteration of the boot stage process then continues at Block 402 with the next phase estimates.

Figure 4B:
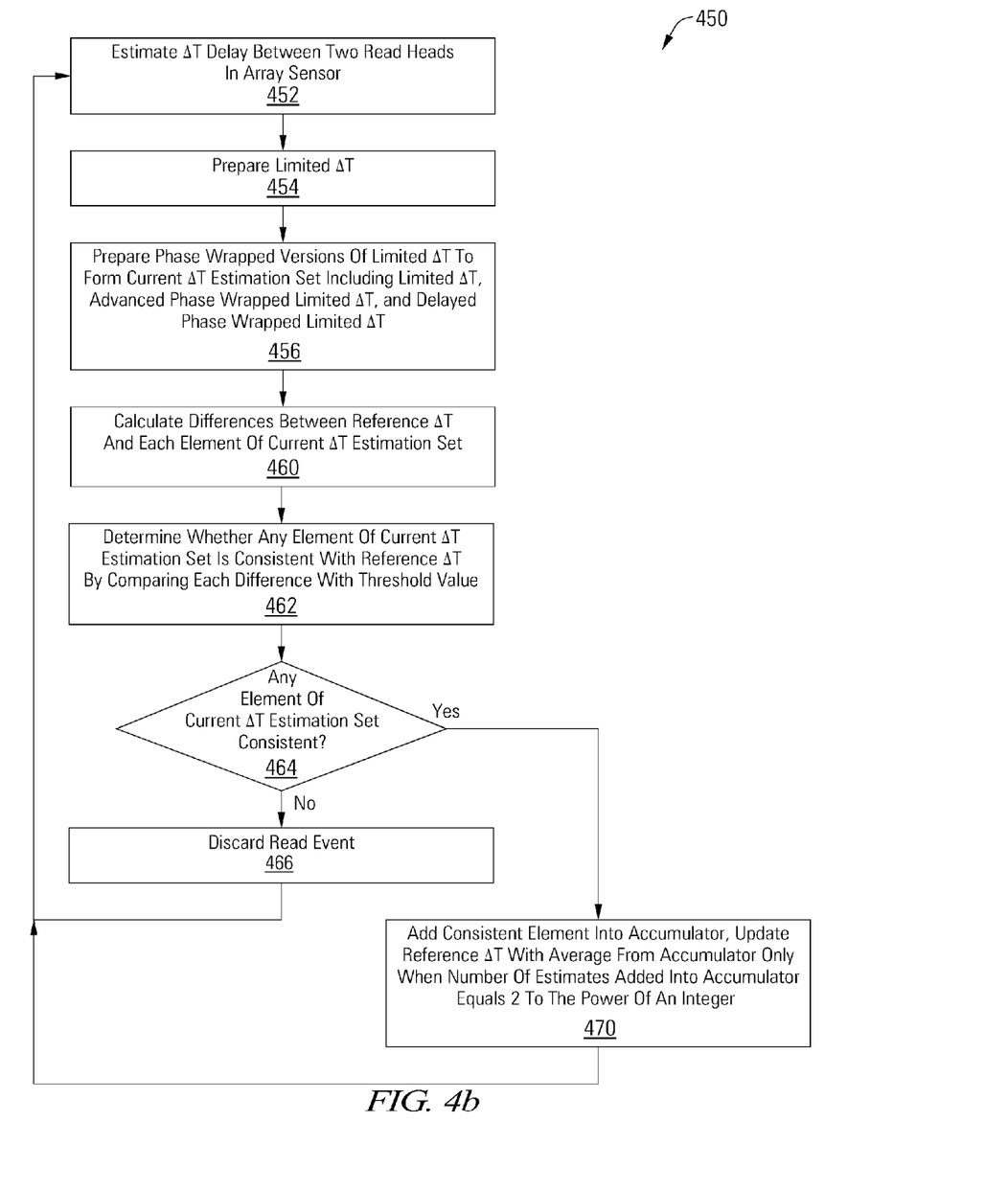
FIG. 4b is a flow diagram showing an update stage in a method for head separation estimation in accordance with some embodiments of the present invention.

However, if an element of the current ΔT estimation set is consistent, that consistent element is averaged into the reference ΔT and is added into the accumulator. This can be accomplished, for example, as set forth in the following pseudo-code:

2T:
If condition A is true, add ΔT_limit into accumulation
If condition B is true, add ΔT_limit+1024 into accumulation
If condition C is true, add ΔT_limit−1024 into accumulation
3T:
If condition A is true, add ΔT_limit into accumulation
If condition B is true, add ΔT_limit+1536 into accumulation
If condition C is true, add ΔT_limit−1536 into accumulation The head separation estimation then continues with the update stage illustrated in FIG. 4b. Turning to FIG. 4b, a flow diagram 450 illustrates the update stage in a method for head separation estimation in accordance with some embodiments of the present invention. The update stage updates the reference value for the ΔT estimate and the accumulator that produces the average ΔT, using only ΔT estimates that are correctly matched phase wrapping and that satisfy the consistency checks.

Following flow diagram 450, the ΔT phase delay between two read heads in an array sensor is estimated. (Block 452) The ΔT estimate is limited to a range based on the phase range of the preamble pattern period. (Block 454) This can be accomplished, for example, as set forth in the pseudo-code associated with Block 404 above. Phase wrapped versions of the limited ΔT are prepared to form a current ΔT estimation set including the limited ΔT, an advanced phase wrapped limited ΔT, and a delayed phase wrapped limited ΔT. (Block 456) The difference between the previous reference ΔT and each element of the current ΔT estimation set is calculated. (Block 460) Each of the differences are compared with a threshold value to determine whether any element of the current ΔT estimation set is consistent with the previous reference ΔT. (Block 462) The operations of steps 460, 462 can be combined and represented as conditions in the pseudo-code associated with Blocks 410, 412. A determination is made as to whether any element of the current ΔT estimation set is consistent. (Block 464) If no element of the current ΔT estimation set is consistent, the read event is discarded. (Block 466) The next iteration of the boot stage process then continues at Block 452 with the next phase estimates.

However, if an element of the current ΔT estimation set is consistent, that consistent element is added into the accumulator. (Block 470) In some embodiments, the reference ΔT is also updated as the average of the value in the accumulator, but only when the number of estimates that have been added into the accumulator is equal to 2 to the power of an integer. The reference ΔT is thus only updated in some embodiments when the number of accumulated read events is equal to 1, 2, 4, 8, 16, 32, 64, 128, etc.

Figure 5:
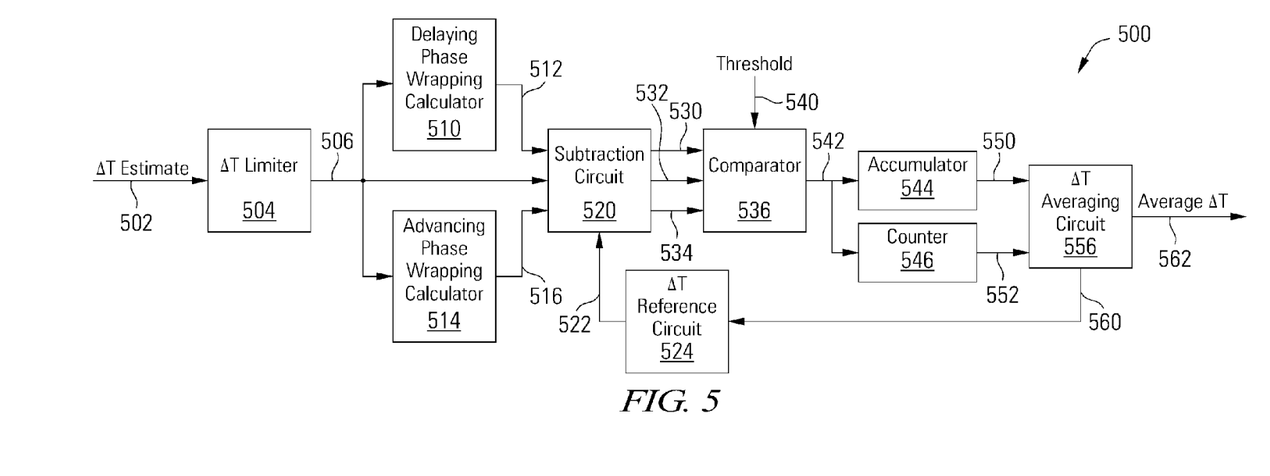
FIG. 5 is a block diagram of a head separation estimation calculation circuit in accordance with some embodiments of the present invention.

Turning now to FIG. 5, a head separation estimation calculation circuit 500 is illustrated which can be used to implement the methods of FIGS. 4a-4b in accordance with some embodiments of the present invention. A ΔT estimate 502 is obtained from any suitable source, such as, but not limited to, a Zero Error Phase Start (ZPS) detector circuit which calculates phase estimates based upon sinusoidal preamble patterns as they are read by read heads in an array reader, and a subtraction circuit to calculate the difference between the phase for two read heads. Based upon the disclosure provided herein, one of ordinary skill in the art will recognize a variety of phase detector circuits that can be used in relation to different embodiments of the present invention to supply the ΔT estimate 502.

The ΔT estimate 502 is provided to a ΔT limiter circuit 504, which limits the ΔT estimate to a range based on the phase range of the preamble pattern period, yielding a limited ΔT estimate 506. For example, given a 2T preamble with a range of 1024 radians, the ΔT estimate is limited to a range of

[−512,511] by either adding or subtracting 1024 to the ΔT estimate in some embodiments. Given a 3T preamble with a range of 1536 radians, the ΔT estimate is limited to a range of [−768,767] by either adding or subtracting 1536 to the ΔT estimate in some embodiments. The ΔT limiter circuit 504 can include any suitable circuits for limiting the ΔT estimate to the desired range, such as, but not limited to, comparators, adders and subtractors. Based upon the disclosure provided herein, one of ordinary skill in the art will recognize a variety of circuits that can be used in relation to different embodiments of the present invention to limit the ΔT estimate.

The limited ΔT estimate 506 is provided to delaying and advancing phase wrapping calculators 510, 514, which subtract and add phase wrapping values, respectively, to the limited ΔT estimate 506, yielding a delayed limited ΔT estimate 512 and an advanced limited ΔT estimate 516. The limited ΔT estimate 506, the delayed limited ΔT estimate 512 and the advanced limited ΔT estimate 516 are provided to a subtraction circuit 520, which subtracts a reference ΔT 522 from each of the limited ΔT estimates 506, 512, 516. The subtraction circuit 520 yields differences 530, 532, 534.

A comparator 536 compares each of the differences 530, 532, 534 with a threshold 540 to determine which, if any, of the differences 530, 532, 534 are consist with the reference ΔT 524. If the absolute values of any of the differences 530, 532, 534 are less than threshold 540, the limited ΔT estimate 506 associated with the difference (530, 532, or 534) that was consist with the reference ΔT 524 is selected as output 550 to be stored in accumulator 544. A counter 546 is incremented each time a limited ΔT estimate 506 is stored in accumulator 544.

A ΔT averaging circuit 554 receives the accumulator value 550 from accumulator 544 and the count 552 from counter 546 and divides the two to yield the average ΔT estimate 562 as the output of the head separation estimation calculation circuit 500.

A ΔT reference calculation circuit 524 updates the reference ΔT 522 as the average ΔT estimate 560 from the ΔT averaging circuit 554 each time the count in counter 546 is equal to 2 to the power of an integer, i.e., 1, 2, 4, 8, 16, 32, 64, 128, etc.

An example of the operation of an embodiment of the head separation calculation is presented in the table below:

|  | read1 | read2 | read3 | read4 | read5 | read6 | read7 |
| --- | --- | --- | --- | --- | --- | --- | --- |
| Phase 1 | 620 | 100 | 730 | 850 | 100 | 1000 | 10 |
| Phase 2 | 1020 | 700 | 102 | 230 | 510 | 400 | 291 |
| ΔT | 400 | 600 | −628 | −620 | 410 | −600 | 281 |
| ΔT_limit | 400 | −424 | 396 | 404 | 410 | 424 | 281 |
| ΔT_adv | 1424 | 600 | 1420 | 1428 | 1434 | 1448 | 1305 |
| ΔT_del | −624 | −1448 | −628 | −620 | −614 | −600 | −743 |
| ΔT_ref | 400 | 400 | −424 | 396 | 400 | 400 | 408 |
| ΔT_limit - ΔT_ref | 0 | −824 | 820 | 8 | 10 | 24 | −127 |
| ΔT_adv - ΔT ref | 1024 | 200 | 1844 | 1032 | 1034 | 1048 | 897 |
| ΔT_del - ΔT_ref | −1024 | −1848 | −204 | −1016 | −1014 | −1000 | −1151 |
| ΔT into ACCU | 400 | −424 | 396 | 404 | 410 | 424 | 281 |

In this example, the 2T preamble corresponds to 1024 radians, and the limit applied to ΔT places ΔT_limit within the range [−512,511]. The example threshold is set at 128.

In the first read event, the phase of the signal from the first read head is 620 radians and the phase of the signal from the second read head is 1020 at a particular same point. The system begins in the boot stage as per FIG. 4a. The ΔT is calculated as 1020−620 yielding 400. Because the ΔT of 400 already falls within the range [−512,511], ΔT_limit is set to ΔT or 400. Because there is no previous value for the reference ΔT (ΔT_ref) in the first read event, ΔT_ref is set to ΔT_limit or 400, the accumulator is initialized to ΔT_limit or 400, and the accumulator counter is set to 1.

In the second read event, phase 1 is 100 and phase 2 is 700. ΔT is 700−100 or 600. Because 600 is outside the limiting range, ΔT_limit is set in this read event to ΔT−1024 or −424. The advanced phase wrapped limited version of ΔT, or ΔT_adv, is calculated by adding 1024 to ΔT_limit, yielding 600. The delayed phase wrapped limited version of ΔT, or ΔT_del, is calculated by subtracting 1024 from ΔT_limit, yielding −1448. ΔT_ref, initialized as 400 in the first read event, is subtracted from each version of ΔT_limit (ΔT_limit, ΔT_adv, and ΔT_del), yielding −824, 200, and −1848, respectively. The absolute value of each of these difference values is compared with the threshold to determine whether any is within the threshold and therefore consistent. In this case, none is below 128, thus read event 1 is discarded. ΔT_ref is set to ΔT_limit or −424, the accumulator is re-initialized to ΔT_limit or −424, and the accumulator counter is set to 1.

If the ΔT from the first read event is incorrect but the ΔT from the second read event is correct, this algorithm will reject the first ΔT and use the second ΔT as ΔT_ref. However, if ΔT from both the first and second read events were incorrectly biased in the same direction, they would be consistent even though incorrect. In some embodiments, this case is handled by a ΔT_ref_valid flag allowing previous read events to be discarded in some instances. In the system including the ΔT_ref_valid flag, in read event 2, if none of the difference values are consistent, meaning that the absolute value of each of the difference values is greater than the threshold, the previous read event (read event 1) is discarded, the accumulator and ΔT_ref are both set to ΔT_limit of read 2, the counter is set to 1, and the ΔT_ref_valid flag is set to 0. If, however one of the difference values is consistent, the corresponding version of ΔT_limit from read 2 is added to the accumulator, the counter is incremented to 2, ΔT_ref is set to the accumulator value divided by the counter or 2, and the ΔT_ref_valid flag is set to 1. Given the specific numerical examples of the table above, none of the difference values are consistent, so the previous read event (read event 1) is discarded.

In the third read event, phase 1 is 730 and phase 2 is 102. ΔT is 730−102 or −628. Because −628 is outside the limiting range, ΔT_limit is set in this read event to ΔT+1024 or 396. The phase wrapped versions of ΔT_limit and the difference values are calculated as shown in the table. If the ΔT_ref_valid flag is 0, and none of the consistency checks were satisfied, then the previous read event (read event 2) is discarded, the accumulator and ΔT_ref are both set to ΔT_limit of read 3, the counter is set to 1, and the ΔT_ref_valid flag is set to 0. If the ΔT_ref_valid flag is 0, and one of the consistency checks is satisfied, the corresponding version of ΔT_limit from read 3 is added to the accumulator, the counter is set to 2, ΔT_ref is set to the accumulator value divided by the counter or 2, and the ΔT_ref_valid flag is set to 1. If the ΔT_ref_valid flag is 1, and none of the consistency checks were satisfied, then the current read event (read event 3) is discarded. If the ΔT_ref_valid_flag is 1, and one of the consistency checks is satisfied, then the corresponding version of ΔT_limit from read 3 is added to the accumulator and the counter is incremented to 3. Because the count of 3 is not equal to 2 to the power of an integer, ΔT_ref is not updated in this read event. Given the specific numerical examples of the table above, none of the difference values are consistent, so the previous read event (read event 2) is discarded. The accumulator and ΔT_ref are both set to ΔT_limit of read 3 or 396, the counter is set to 1, and the ΔT_ref_valid_flag is set to 0.

Continuing on, for the n'th read event, if the ΔT_ref_valid_flag were 0, and none of the consistency checks were satisfied, then the previous read event (read event n−1) would be discarded, the accumulator and ΔT_ref are both set to the ΔT_limit of read n, the counter would be set to 1, and the ΔT_ref_valid_flag would be set to 0. If the ΔT_ref_valid_flag were 0, and one of the consistency checks were satisfied, the corresponding version of ΔT_limit from read n would be added to the accumulator, the counter would be set to 2, ΔT_ref is set to the accumulator value divided by the counter or 2, and the ΔT_ref_valid_flag is set to 1. If the ΔT_ref_valid_flag were 1, and none of the consistency checks were satisfied, then read event n would be discarded. If the ΔT_ref_valid_flag were 1, and one of the consistency checks were satisfied, then the corresponding version of ΔT_limit from read n would be added to the accumulator and the counter would be incremented. If the counter number n was equal to 2 to the power of an integer, ΔT_ref would be updated as the value in the accumulator divided by the counter value.

Given the specific numerical examples of the table above, in the fourth read event the difference between ΔT_limit and ΔT_ref is 404-396 or 8, which is less than the threshold of 128. Because the ΔT_ref_valid_flag was 0, ΔT_limit 404 is added to the accumulator resulting in an accumulator value of 800, the counter is set to 2, and the ΔT_ref_valid_flag is set to 1. Because the counter number 2 is equal to 2 to the power of an integer, ΔT_ref is set to the accumulator value divided by the counter resulting in 400.

In the fifth read event, the difference between ΔT_limit and ΔT_ref is 410−400 or 10, which is less than the threshold of 128. Because the ΔT_ref_valid_flag is 1, ΔT_limit 410 is added to the accumulator for a total of 1210 and the counter is incremented to 3. Because the counter number 3 is not equal to 2 to the power of an integer, ΔT_ref is not updated but is left at 400.

In the sixth read event, the difference between ΔT_limit and ΔT_ref is 424−400 or 24, which is less than the threshold of 128. Because the ΔT_ref_valid_flag is 1, ΔT_limit 424 is added to the accumulator for a total of 1634 and the counter is incremented to 4. Because the counter number 4 is equal to 2 to the power of an integer, ΔT_ref is set to the accumulator value 1634 divided by the counter 4, resulting in an integer value of 408 for ΔT_ref.

In the seventh read event, the difference between ΔT_limit and ΔT_ref is 281-408, yielding an absolute value of the difference of 127, which is less than the threshold of 128. Because the ΔT_ref_valid_flag is 1, ΔT_limit 281 is added to the accumulator for a total of 1915 and the counter is incremented to 5. Because the counter number 5 is not equal to 2 to the power of an integer, ΔT_ref is not updated but is left at 408. The head separation estimation process continues in this manner, with the average ΔT being the accumulator value divided by the accumulator counter value, and with the ΔT_ref being updated only when the counter value is equal to 2 to the power of an integer.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that some functions of the blocks, systems or circuits discussed herein may be implemented in either software or firmware. In some such cases, some portions of the system may be implemented using their software or firmware equivalent.

In conclusion, the present invention provides novel estimation of head separation for a two dimensional magnetic recording servo system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage system comprising:
 a magnetic storage medium;
 a magnetic sensor comprising an array of read heads configured to read a data track on the magnetic storage medium; and
 a head separation calculation circuit configured to calculate a phase offset between signals from a first and a second of the read heads in the array of read heads based on phase estimates for the signals, wherein the head separation calculation circuit is configured to correct for phase wrapping differences between the signals.

2. The storage system of claim 1, wherein the head separation calculation circuit is configured to calculate a difference between phase measurements for the signals.

3. The storage system of claim 1, wherein the head separation calculation circuit comprises a phase offset limiter operable to shift the phase offset to lie within a predetermined range.

4. The storage system of claim 1, wherein the head separation calculation circuit comprises at least one phase wrapping calculator configured to apply a phase wrap to a version of the phase offset.

5. The storage system of claim 1, wherein the head separation calculation circuit comprises a subtraction circuit configured to calculate differences between a version of the phase offset and phase-wrapped versions of the phase offset.

6. The storage system of claim 1, wherein the head separation calculation circuit further comprises a comparator circuit configured to compare the differences with a threshold.

7. The storage system of claim 1, wherein the head separation calculation circuit is configured to calculate an average phase offset, and to include the phase offset in the average phase offset only after accounting for phase wrapping in the phase offset.

8. The storage system of claim 1, wherein the head separation calculation circuit is configured to calculate an average phase offset, and to include the phase offset in the average phase offset only when the phase offset is consistent with a phase offset reference value based on at least one previous phase offset.

9. The storage system of claim 1, wherein the head separation calculation circuit comprises an accumulator configured to accumulate the phase offset, and a phase offset reference calculator circuit configured to update a phase offset reference value based on a value in the accumulator and on a number of phase offsets accumulated in the accumulator.

10. The storage system of claim 9, wherein the phase offset reference calculator circuit is configured to update the phase offset reference value only when a number of phase offsets accumulated in the accumulator is equal to two to a power of an integer.

11. A method for calculating an average phase offset in a two dimensional magnetic recording system, comprising:

calculating a phase offset as a difference between a phase of a first signal derived from a first read head and a second phase of a second signal derived from a second read head;

correcting for phase wrapping differences between the phase offset and a previous phase offset;

determining whether the phase offset is consistent with the previous phase offset; and calculating an average phase offset which includes the phase offset only if it is consistent with the previous phase offset.

12. The method of claim 11, wherein correcting for phase wrapping difference comprises limiting the phase offset to a predetermined phase range.

13. The method of claim 12, wherein the predetermined phase range is based at least in part on a preamble pattern read by the first read head and the second read head.

14. The method of claim 11, wherein correcting for phase wrapping differences comprises generating phase wrapped versions of the phase offset.

15. The method of claim 14, wherein the phase wrapped versions comprise a phase advanced version of the phase offset and a phase delayed version of the phase offset.

16. The method of claim 14, wherein generating the phase wrapped versions comprises shifting the phase offset by a period of a preamble pattern used to calculate the phase offset.

17. The method of claim 11, wherein determining whether the phase offset is consistent with the previous phase offset comprises determining whether a difference between the phase offset and a reference phase offset is less than a threshold difference, after correcting for phase wrapping differences.

18. The method of claim 11, wherein determining whether the phase offset is consistent with the previous phase offset comprises generating a reference phase offset based on at least said previous phase offset.

19. The method of claim 18, wherein calculating the average phase offset comprises adding the phase offset to an accumulator, and wherein generating the reference phase offset comprises averaging the accumulator contents only when a number of phase offsets accumulated in the accumulator is equal to two raised to an integer power.

20. A storage device, comprising:

a magnetic storage medium;

an array reader disposed in relation to the storage medium and operable to read and write data on the storage medium; and a head separation calculation circuit operable to calculate an average phase offset between signals from read heads in the array reader, the head separation calculation circuit comprising:

means for calculating a phase offset as a difference between a phase of a first signal derived from a first read head in the array reader and a second phase of a second signal derived from a second read head in the array reader;

means for correcting for phase wrapping differences between the phase offset and a previous phase offset;

means for determining whether the phase offset is consistent with the previous phase offset; and means for calculating an average phase offset which includes the phase offset only if it is consistent with the previous phase offset.

\* \* \* \* \*